United States Patent [19]

Haas et al.

[11] Patent Number: 5,191,627
[45] Date of Patent: Mar. 2, 1993

[54] REDUCTION OF INTERSYMBOL INTERFERENCE IN OPTICAL FIBER SYSTEMS BY WAVELENGTH FILTERING

[75] Inventors: Lee C. Haas, Raleigh; Mitchell L. Loeb, Durham; George R. Stillwell, Jr., Raleigh, all of N.C.

[73] Assignee: International Business Machines Corporation, Armonk, N.Y.

[21] Appl. No.: 586,644

[22] Filed: Sep. 24, 1990

[51] Int. Cl.⁵ .............................. G02B 6/28
[52] U.S. Cl. .......................... 385/24; 385/15; 385/39; 359/154
[58] Field of Search ............ 350/96.15, 96.16; 385/24, 15, 39; 359/154, 158, 185

[56] References Cited

U.S. PATENT DOCUMENTS

| | | | |
|---|---|---|---|
| 3,699,445 | 10/1972 | Kinsel | 359/154 |
| 4,636,029 | 1/1987 | Johansson et al. | 350/96.16 |
| 4,680,809 | 7/1987 | Hartkopf et al. | 350/96.10 X |
| 4,750,802 | 6/1988 | Bhagavatula | 350/96.16 X |
| 4,778,239 | 10/1988 | Shaw et al. | 350/96.16 |
| 4,958,910 | 9/1990 | Taylor et al. | 350/96.15 X |

Primary Examiner—John D. Lee
Assistant Examiner—Phan Thi Heartney
Attorney, Agent, or Firm—Joscelyn G. Cockburn

[57] ABSTRACT

Described is a circuit arrangement which reduces intersymbol interference among pulses in a fiber optic communications network. The circuit arrangement includes a wavelength separator which separates each pulse into a plurality of sections which are shifted in time and then realigned relative to its center section to form non-overlapping pulses.

15 Claims, 4 Drawing Sheets

REDUCTION OF INTERSYMBOL INTERFERENCE IN OPTICAL FIBER SYSTEMS BY WAVELENGTH FILTERING

BACKGROUND OF THE INVENTION (i) Field of the Invention

The present invention relates to fiber optic communications systems in general and more particularly, to the apparatus and method which improve its transmission characteristics.

(ii) Prior Art

The proliferation of data handling networks has created a need for more effective and efficient interconnecting transmission systems. A typical data handling network includes a plurality of data handling devices (such as work stations, computers, telephones, etc.) interconnected by a transmission system. Each device includes a transmitter which outputs digital data that is transmitted over the transmission system to the receiver of a receiving device. The transmission system may be a physical medium (e.g., wire, optical fiber, etc.) or non-physical medium which is often referred to as wireless communication.

The present invention relates to a communications network in which fiber optics is the interconnecting medium. This type of network is important because it has the capability of transmitting large volumes of data at relatively high speed, say 100 or greater million bits per sec. One of the problems which is associated with fiber optic networks is intersymbol interference which limits the length of an optical fiber link and the speed of data on the link. For example, a typical laser driven single-mode fiber system operating at 2.5 Gb/s would be limited to 1.7 Km. This means that in order for data to be reliably recovered at a receiver, the maximum spacing between the transmitter and the receiver is approximately 1.7 Km. As is well known to those skilled in the communications technology, a fiber link of 1.7 Km is too short for either a local area network or metropolitan area network. Of course, if the data rate drops, one may transmit and recover data reliably over a longer optical fiber link.

A major cause of intersymbol interference is chromatic dispersion. The chromatic dispersion is an optical phenomenon in which light is propagated at different speeds through the fiber. The speed is related to the wavelength of the light. The power in an optical pulse is distributed over a band of wavelengths which are representative of the spectral width of the source which generates the pulse. Therefore, when a light source such as a laser, generates and launches a pulse into an optical fiber link, the power is distributed over a band of wavelengths. Because each wavelength travels down the fiber at different speeds (chromatic dispersion), the power arrives at different times at the receiver. Stated another way, some of the power in the pulse arrives at the receiver early and some arrives late. The result is that a sharply defined pulse traveling down the fiber is spread out in time to overlap other pulses at the receiver.

FIG. 1 is a graphical representation of the "spread-out" phenomenon, at the receiver of a receiving unit, which the inventors recognized and solved with the present invention. For purposes of this application, the overlapping of the pulse is called intersymbol interference. The figure shows a grouping of overlapped pulses in the time domain. In particular, time is represented on the horizontal axis and pulses 10, 12, and 14 are traveling in the direction of arrow 16. The broadening of the pulses causes overlap in both leading and trailing edges. The overlapping areas may be viewed as composite signals with energy that cannot be easily correlated with its associated pulses. Stated another way, the overlapping energy from adjacent pulses interferes with proper detection of the data.

Since adjacent pulses in a digital data stream must be separated sufficiently in time to assure accurate detection of each pulse, the data rate is limited by the wavelength dependent delay down the fiber interacting with the band of wavelengths produced by the source. Therefore, if the light source has a narrow spectral width, the intersymbol interference is minimized. Laser light sources are devices with narrow spectral widths and are widely used in fiber optic communications networks. However, even with the use of the best quality lasers and/or optical fiber, as the data rate and/or link length increase, intersymbol interference limits the data transmission speed.

U.S. Pat. Nos. 4,538,283 and 4,555,789 disclose a type of intersymbol interference which causes the "eye" opening exhibited by pulses at the receiver to close, beginning at the corners and progressing towards the center. This phenomenon affects the sensitivity of the receiver to differentiate between a "0" and a "1". An equalizer circuit is used to restore the sensitivity of the receiver. It should be noted that these solutions are done in the electrical domain and are limited by the proximity of the carrier frequency to the data rate.

SUMMARY OF THE INVENTION

The current invention overcomes the prior art limitations by operating in the optical domain, where the carrier frequency in many orders of magnitude greater than the data rate.

It is a general object of the present invention to provide a more efficient fiber optics communications network then was heretofore possible.

It is still another object of the present invention to provide a fiber optics communications network in which the digital pulses are overlapped.

These and other objects and advantages of this invention are realized by separating each pulse into a central section, a leading edge section and a trailing edge section. The edge sections are adjusted in time and recombined with the central section to generate a recovered pulse with a reduction in overlapping edges.

More particularly, a fiber optic communications network includes at least a transmitting device interconnected by a fiber optic link to a receiving device. The transmitting device includes an edge-emitting LED (ELED) or a laser system with an approximately Gaussian wavelength distribution which generates a digital pulse stream that is transmitted through the interconnecting fiber optic link to the receiver of the receiving unit.

The receiver includes an optical wavelength separator which separates each pulse into three pulse trains which are independently detected. One pulse train is composed of the energy from the bands of wavelengths which will be least delayed by the fiber and thus arrive early. Another pulse train comes from the band of wavelengths with medium fiber delay. The final pulse train comes from the band of wavelengths with maximum delay. The fastest pulse trains are delayed and recombined with the slow pulse train to output a reconstructed pulse. The reconstructed pulses are used to recover the information which was transmitted.

These and other objects and advantages of this invention will be more fully described in the accompanying drawings.

DETAILED DESCRIPTION OF THE PREFERRED EMBODIMENT

Figure 1:
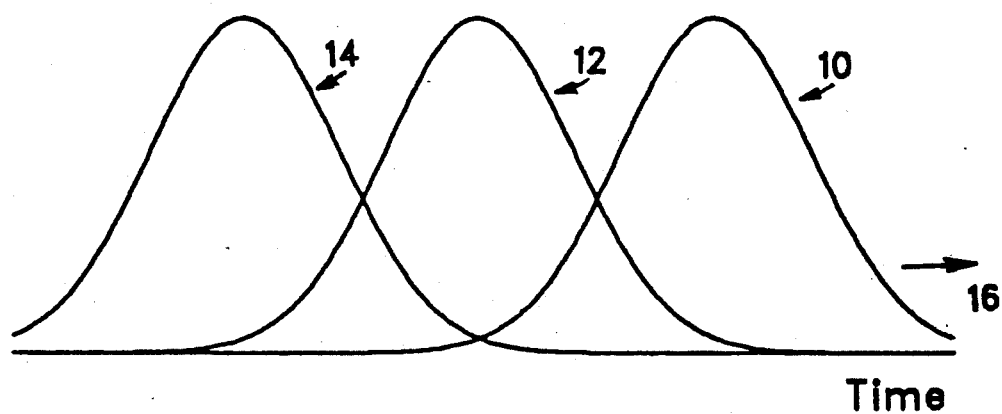
FIG. 1 shows a graphical representation of optical pulses overlapping in the time domain. The sketch is helpful in understanding the problem which the present invention solves.
Figure 2:
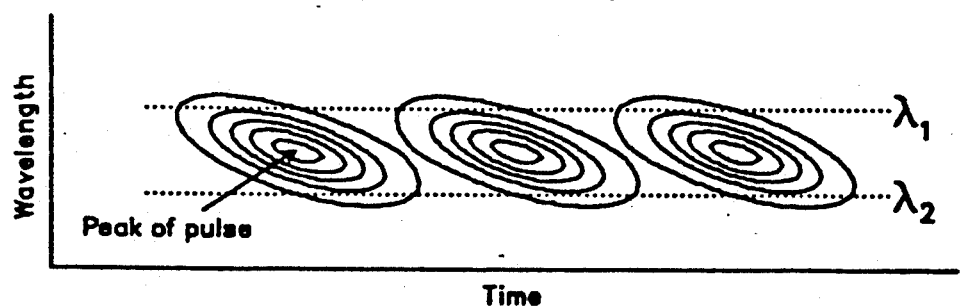
FIG. 2 shows a graphical representation of the pulses in a time/wavelength domain.

FIG. 2 shows a graphical representation of what the pulses in FIG. 1 would look like if viewed with the added dimension of source wavelength. The sketches of FIG. 2 are contour maps where the vertical dimensions in FIG. 1 are now represented by flat contour liens. In FIG. 2, time is plotted on the horizontal axis while wavelength ($\lambda$) is plotted on the vertical axis. The transmitter optical source (not shown) is assumed to have a Gaussian wavelength distribution. This sketch is helpful to understand the underlying principle of the present invention. When viewed in the wavelength/time domain, what appears to be overlap in FIG. 1 is actually separable in the wavelength dimension.

Still referring to FIG. 2, the present invention separates each pulse (FIG. 1) into its constituent wavelength bands. Therefore, wavelengths which are greater than $\lambda 1$ are grouped into a first band. A second band includes the wavelengths that are between $\lambda 1$ and $\lambda 2$. The third band includes the wavelengths less than $\lambda 2$. Stated another way, each pulse is separated into a plurality of pulse trains or its constituent pulse trains. Each pulse train is based upon the energy contained in the associated wavelengths. One pulse train is composed of energy from the band of wavelengths which is greater than $\lambda 1$. A second pulse train is composed of energy from the band of wavelengths between $\lambda 1$ and $\lambda 2$. A third pulse train is based upon the energy from the band of wavelengths less than $\lambda 2$. It should be noted that even though the pulses are divided into three pulse trains, this is only representative and it is within the skill of the art to separate each pulse into greater or less than three pulse trains. As stated previously, the speed with which a pulse is transmitted in the fiber depends on the wavelength characteristics of its constituents pulse trains. As a result, certain wavelength sections of the same pulse train are traveling faster than other sections. Having separated the pulse into its component wavelengths, the wavelengths which are traveling the fastest in the fiber are delayed at the receiver so that the portion of the pulse with the slower wavelengths will catch up. The respective sections of each pulse are then recombined to form a unified pulse which is outputted for use by the system.

Figure 3A:
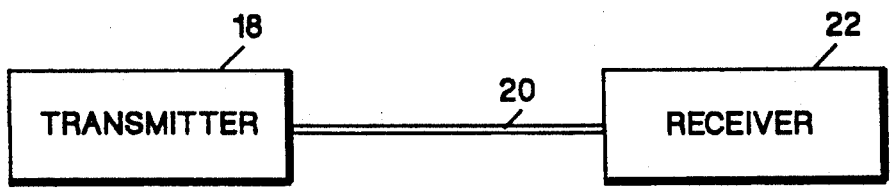
FIGS. 3A and 3B show a simplified block diagram of a fiber optical communications network having an improved receiver embodying the teachings of the present invention.

FIG. 3A shows a communications system embodying the teachings of the present invention. The system includes a transmitter 18, a fiber optic communications network 20 and a receiver 22. The transmitter 18 includes an optical generator (not shown) which receives a data stream converts it to optical pulses which are transmitted by the fiber optics communications network 20 to receiver 22. As stated previously, pulses during transmission through the fiber optic communications network are spread out and arrive in overlapping orientation at receiver 22. In receiver 22, the overlapping pulses are realigned and reconstructed.

Figure 3A:
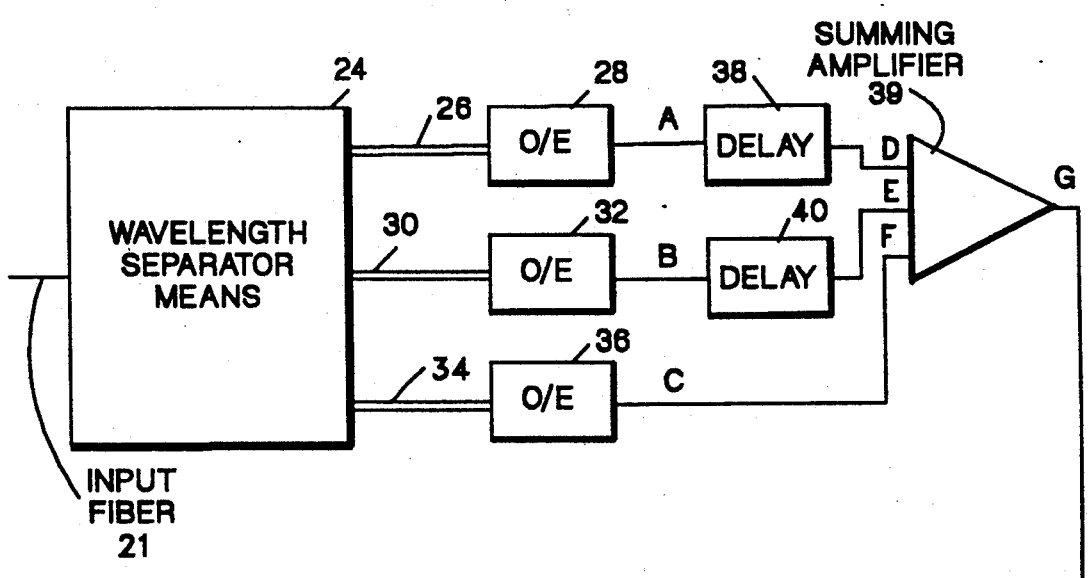
Figure 3B:
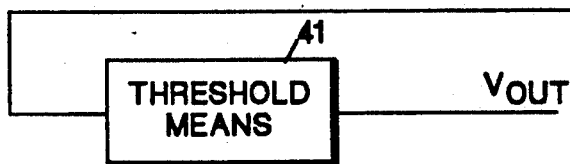

Referring to FIG. 3B, the receiver includes wavelength separator means 24 which receives the transmitted optical data stream from input fiber 21 and separates each pulse into a plurality of pulse trains. For example, pages 185 and 186 of a book entitled "Monomode Fiber Optic Design with Local Area and Long-Haul Network Applications," by Donald G. Baker, describes demultiplexers which could be used as wavelength separator means 24. It is well within the skill of one skilled in the art to use other types of wavelength separators without deviating from the spirit and teaching of the present invention. For completeness, the teachings of the referenced article are incorporated by reference. Each pulse train is composed of energy from the associated band of wavelengths. Thus, with reference to FIG. 2, wavelengths which are greater than $\lambda 1$ are grouped into one pulse train. A second pulse train is composed of energy from the band of wavelengths between $\lambda 1$ and $\lambda 2$. A third pulse train is composed of the energy from the band of wavelengths less than $\lambda 2$. The pulse train which is in the wavelength band that is greater than $\lambda 1$ is fed over fiber optic conductor 26 to optical-to-optical (O/E) converter 28. Likewise, the pulse train which is composed of the energy from the band of wavelengths between $\lambda 1$ and $\lambda 2$ are fed over optical fiber conductor 30 to optical-to-electrical (O/E) converter 32. Similarly, pulse train that is composed of the energy from the band of wavelengths less than $\lambda 2$ is fed over optical fiber conductor 34 to optical-to-electrical (O/E) converter 36. The optical-to-electrical converters (OE) 28, 32 and 36 convert the optical pulse to electrical signals which are fed to electrical conductors A, B and C respectively.

Still referring to FIGS. 2 and 3B, the pulse trains that are derived from the energy band of wavelengths greater than $\lambda 1$ and between $\lambda 1$ and $\lambda 2$ and traveling faster than the pulse train that is composed of energy from the band of wavelength less than $\lambda 2$. In order to align the respective sections of each individual pulse, the pulses on conductors A and B are delayed by delay means 38 and 40, respectively. The delayed signal from delay means 38 is fed over conductor D to summing amplifier 39. Likewise, the delayed pulse train from delay means 40 is fed over conductor E to summing amplifier 39. Finally, the pulse train from O/E 36 is fed over conductor C to summing amplifier 39. Summing amplifier 39 recombines the pulse train to form a unified pulse which is outputted on conductor G. The pulse on conductor G is fed into threshold means 41 which output is pulsed to terminal Vout if its input exceeds a predetermined level.

Figure 4:
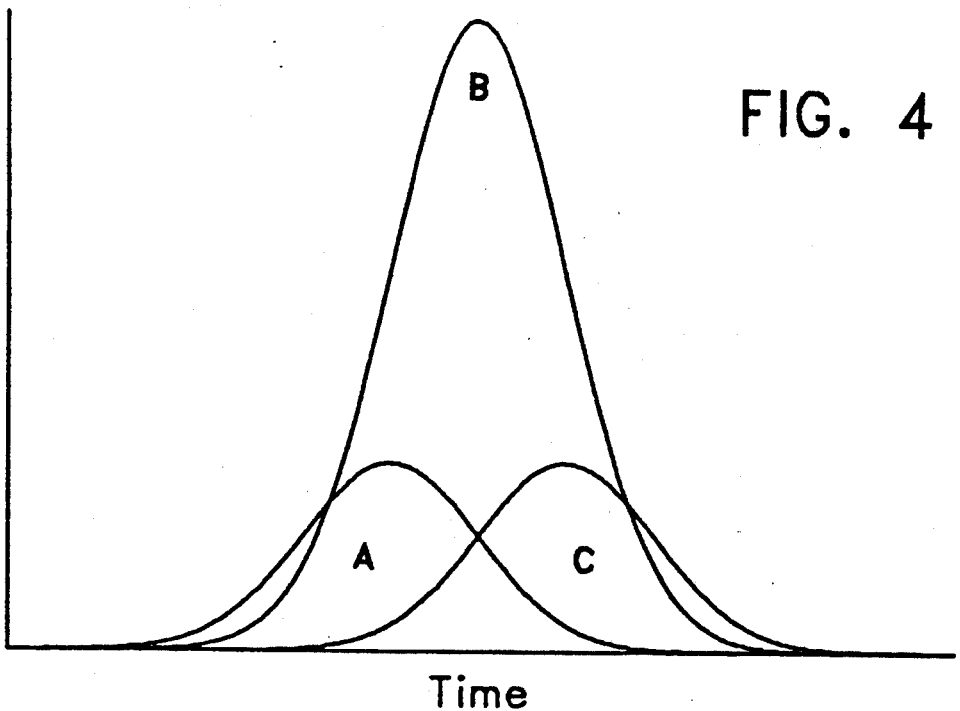
FIG. 4-6 show pulses which are generated at different points of the receiver circuit. The pulses are helpful in understanding the operation of the improved receiver.
Figure 5:
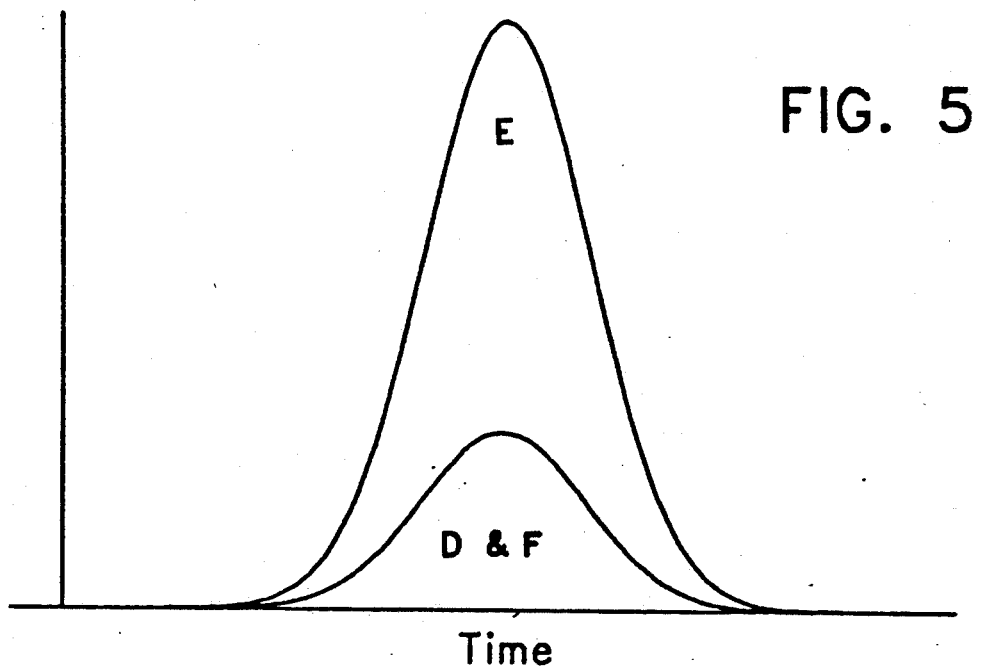
Figure 6:
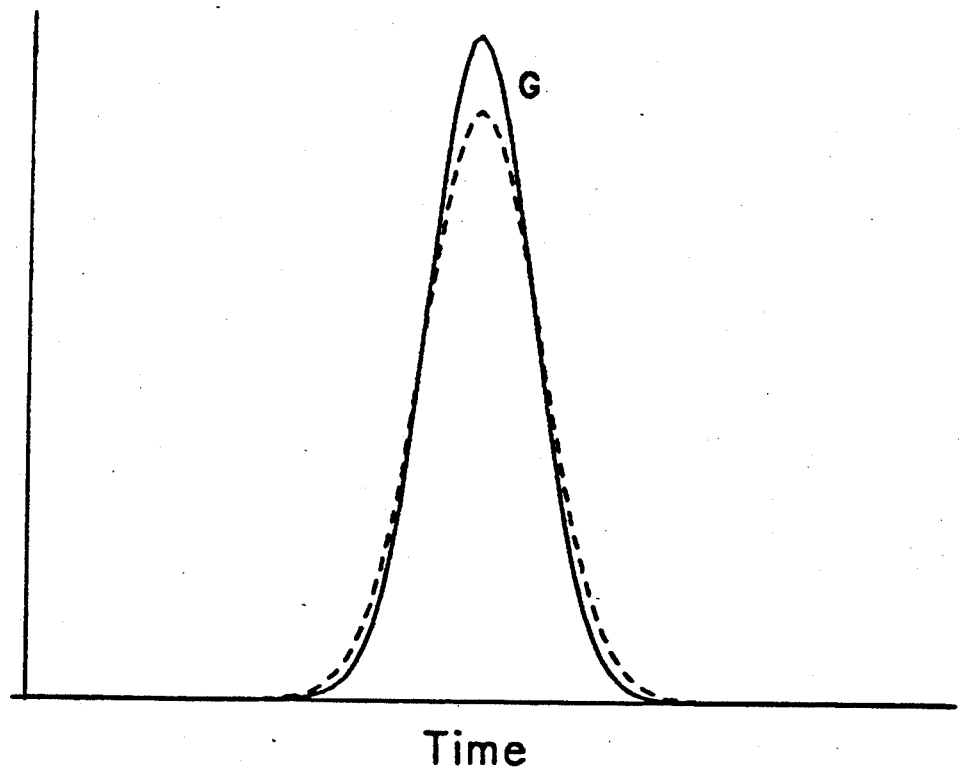

FIGS. 4-6 give graphical representation of pulses as they are processed and appear at respective points on the circuit of FIG. 3. These graphs are helpful in understanding the operation of the circuit shown in FIG. 3. Also, like alphabetical characters are used to identify the pulses (FIGS. 4-6) and the conductors (FIG. 3B) on which they are transmitted. The output signals of the optical-to-electrical converters 28, 32 and 36 on conductors A, B and C for each data stream are shown in FIG. 4. In particular, the curve labeled A in FIG. 4 represents the pulse train for the section of the pulse appearing on conductor A (FIG. 3B). Similarly, the curve labeled C represents the portion of the pulse appearing on conductor C. Finally, the pulse labeled B represents the pulse train representing the center section of the pulse and appears on conductor B. It should be noted that the relative delays int he data stream corresponds to the optical velocity for the optical wavelengths in each data stream. The amplitudes are lower in the side data streams (A and C, FIG. 4) because the transmitter produces less energy at these wavelengths. By delaying data streams A and B relative to C in the electrical delay lines, the resulting data streams D, E and F (FIG. 5), at the input to summing amplifier 39 are brought into phase. As shown in FIG. 6, the sum of these signals, at the output of summing amplifier 39 (FIG. 3B) is a data stream in which the interfering skirts or edges of the pulses have been shifted so that the inter-symbol interference is decreased. Thus, the signal can be digitized in threshold detector 41 with less interference from adjacent pulses. The dashed pulse in FIG. 6 represents the original pulse which was inputted by the transmitter (FIG. 3B) while the pulse with the solid line represents the final constructed pulse. It should be noted that the final reconstructed pulse is narrower but has a higher amplitude than the original pulse that is transmitted into the communications network 20.

It should be understood that the three data stream systems shown can be expanded to multiple data streams, each with a particular band of wavelengths and particular delay line so that the chromatic dispersion related inter-symbol interference can be reduced to as small an effect as is desired. Wavelength filtering, analog delay lines, optical-to-electrical converters and amplifiers have all been demonstrated in integrated circuits (IC) form. It is expected that this system could also be fabricated in IC form.

While the invention has been particularly shown and described with reference to the preferred embodiment thereof, it will be understood that various changes in form and details may be made therein without departing from the spirit and scope of the present invention.

I claim:

1. An improved fiber optic communication network comprising:
    a transmitter;
    an illumination means, operatively positioned in said transmitter, said illuminating means generating optical pulses representative of data;
    a fiber optic link coupled to the transmitter and operable for transmitting the optical pulses;
    a receiver coupled to the fiber optic link;
    a first means, operatively positioned within said receiver, said first means receiving the optical pulses and separating each pulse into a plurality of optical pulse trains;
    second means responsive to each of the optical pulse trains for converting each optical pulse train into an electrical pulse train;
    third means for delaying selected ones of the electrical pulse train; and
    fourth means for recombining the pulse trains into a single pulse.

2. The network set forth in claim 1 further including a thresholding device to monitor the single pulse and output a signal pulse if the amplitude of the single pulse exceeds a preset threshold level.

3. The improved fiber optic communications network of claim 1 wherein the first means include a wavelength filter.

4. The improved fiber optic communications network of claim 1 wherein the second means includes optical-to-electrical converters.

5. The fiber optic communications network of claim 1 wherein the third means for delaying the electrical pulse train includes electrical delay lines.

6. The fiber optic communications network of claim 1 wherein the fourth means for recombining the pulse trains includes a summing amplifier.

7. The improved network set forth in claim 1 wherein the illumination means include a laser system.

8. The improved network set forth in claim 1 wherein the illumination means includes an LED system.

9. The improved fabric optic communication network of claim 1 wherein each one of the optical pulse trains is representative of selective wavelength bands within the optical pulses.

10. An improved fiber optic communication network comprising:
    (a) a transmitter;
    an illumination means, positioned in said transmitter for generating optical pulses representative of data;
    (b) a fiber optic link coupled to the transmitter and operable for transmitting the optical pulses; and
    (c) a receiver coupled to the fiber optic link;
    (d) said receiver having a first means for receiving the optical pulses and separating each pulse into a plurality of optical components, with each optical component representative of selected frequency bands within said pulse;
    (e) a first means in said receiver to receive the optical components and converting them into electrical components;
    (f) second means for adjusting and recombining the electrical components into a single pulse.

11. In a fiber optic communications system wherein an optical transmitter generates pulse trains representative of data, a fiber optic transmission medium coupled to the transmitter and operable to transmit the pulse trains and a receiver coupled to the fiber optical transmission medium for receiving said pulse trains, an improved circuit arrangement for processing the pulse trains, said circuit arrangement being positioned at said receiver and comprising:
    (a) a first means for separating each pulse into a plurality of pulse trains;
    (b) a second means for receiving the plurality of pulse trains and converting them into electrical pulse trains;
    (c) a third means coupled to the first means and operable for delaying selected ones of said electrical pulse trains; and
    (d) a fourth means for combining delayed electrical pulse trains with non-delayed electrical pulse trains to form reconstructed unified pulses.

12. An improved receiver for use in a fiber optic communications system, said receiver comprising:
    a first means for receiving optical pulses representative of transmitted data; said first means separating each pulse into its spectral components;

second means for receiving the spectral components and converting it into electrical signals;

third means for delaying selected groups of the electrical signals;

and fourth means for recombining the electrical signals into a single pulse.

13. In a fiber optic communications system wherein an optical transmitter generates pulse trains representative of data, a fiber optic transmission medium coupled to the transmitter and operable to transmit the pulse trains and a receiver coupled to the fiber optic transmission medium for receiving said pulse trains, a method for narrowing the width of the pulses in the pulse train comprising the steps of:

at the receiver;
separating the pulses into their constituent wavelength bands;
converting the wavelength bands into electrical signals;
delaying selective ones of the electrical signals; and
recombining delayed electrical signals and non-delayed electrical signals into single signal pulses.

14. In a fiber optic communications system having a transmitter, a fiber optic transmission media coupled to the transmitter and a receiver coupled to the fiber optical transmission media, a method for managing information comprising the steps of:

(a) at the transmitter,
  (1) generating optical signals representative of data;
(b) transmitting said optical signals through the fiber optic transmission media;
(c) at the receiver,
  (2) receiving the optical signals;
  (3) separating the optical signals into constituent wavelength bands;
  (4) converting the constituent wavelength bands into electrical signals;
  (5) aligning the electrical signals; and
  (6) recombining the electrical signals into a single signal.

15. The method of claim 14 wherein the aligning step further includes the step of delaying for predetermined time intervals selected ones of the electrical signals thereby causing fast moving wavelength bands to be retarded relative to slower moving wavelength bands.

* * * * *